(12) United States Patent
Burberry et al.

(10) Patent No.: US 7,999,832 B2
(45) Date of Patent: Aug. 16, 2011

(54) CONTROLLED GAP STATES FOR LIQUID CRYSTAL DISPLAYS

(75) Inventors: Mitchell S. Burberry, Webster, NY (US); David M. Johnson, West Henrietta, NY (US); Charles M. Rankin, Jr., Penfield, NY (US); Debasis Majumdar, Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 1507 days.

(21) Appl. No.: 11/134,758

(22) Filed: May 20, 2005

(65) Prior Publication Data

US 2006/0262248 A1    Nov. 23, 2006

(51) Int. Cl.
G09G 5/10    (2006.01)

(52) U.S. Cl. .......................................... 345/691; 349/86

(58) Field of Classification Search .................... 349/86, 349/141, 138; 359/51
See application file for complete search history.

(56) References Cited

U.S. PATENT DOCUMENTS

| | | | |
|---|---|---|---|
| 3,816,786 A | 6/1974 | Churchill et al. | |
| 4,435,047 A | 3/1984 | Fergason | |
| 5,289,301 A | 2/1994 | Brewer | |
| 5,368,995 A | 11/1994 | Christian et al. | |
| 5,437,811 A | 8/1995 | Doane et al. | |
| 5,644,330 A | 7/1997 | Catchpole et al. | |
| 5,719,016 A | 2/1998 | Christian et al. | |
| 5,748,277 A | 5/1998 | Huang et al. | |
| 6,133,895 A | 10/2000 | Huang | |
| 6,166,795 A * | 12/2000 | Fujii et al. | 349/141 |
| 6,549,261 B1 | 4/2003 | Okada et al. | |
| 6,639,637 B2 | 10/2003 | Stephenson | |
| 6,707,517 B2 | 3/2004 | Stephenson | |
| 7,532,290 B2 * | 5/2009 | Majumdar et al. | 349/122 |
| 2002/0171910 A1 * | 11/2002 | Pullen et al. | 359/296 |
| 2005/0024307 A1 | 2/2005 | Kwok et al. | |

FOREIGN PATENT DOCUMENTS

| | | | |
|---|---|---|---|
| EP | 1324106 | | 7/2003 |
| EP | 1324106 A1 * | | 7/2003 |
| WO | 97/04398 | | 2/1997 |

OTHER PUBLICATIONS

SID 2001 Digest, Rybalochka et al., Simple Drive Scheme for Bistable Cholesteric LCDs, pp. 882-885.
Co-Pending U.S. Appl. No. 11/134,020, Stanley W. Stephenson, III, *Field Blooming Color Filter Layer For Displays*.
Co-Pending U.S. Appl. No. 11/134,757, Burberry et al., *Reflective Layer Field Blooming Layer for LC Display*.
Co-Pending U.S. Appl. No. 11/133,822, Burberry et al., *Conductive Layer to Reduce Drive Voltage in Displays*.

* cited by examiner

*Primary Examiner* — Quan-Zhen Wang
*Assistant Examiner* — Yuk Chow
(74) *Attorney, Agent, or Firm* — Alston & Bird LLP

(57) ABSTRACT

The present invention relates to a bistable matrix-addressable display element comprising a substrate, a bistable electrically modulated imaging layer having a reflection maximum, at least one conductor, and at least one field-spreading layer between said bistable electrically modulated imaging layer and said at least one conductor, wherein said field-spreading layer has a sheet resistance (SER) of less than $10^9$ Ohms per square and a method of imaging the display comprising identifying an area to be updated of said bistable matrix-addressable display element, wherein said area to be updated comprises rows of pixels; and applying a sequence of drive signals having a 4-phase approach to image said bistable matrix-addressable display element, which may be characterized as a planar reset, left-slope selection method.

16 Claims, 4 Drawing Sheets

STABILIZED REFLECTANCE VS. VOLTAGE

CONTROLLED GAP STATES FOR LIQUID CRYSTAL DISPLAYS

CROSS REFERENCE TO RELATED APPLICATIONS

Reference is made to commonly assigned, co-pending U.S. patent applications:

Ser. No. 11/134,020 by Stanley W. Stephenson, III filed of even date herewith entitled "Field Blooming Color Filter Layer For Displays";

Ser. No. 11/134,757 by Burberry et al. filed of even date herewith entitled "Reflective Layer Field Blooming Layer For LC Display"; and Ser. No. 11/133,822 by Burberry et al. filed of even date herewith entitled "Conductive Layer To Reduce Drive Voltage In Displays", incorporated herein by reference.

FIELD OF THE INVENTION

The present invention relates to bistable displays having one or more field-spreading layers with improved contrast, which in turn produce a higher quality display, especially when a particular sequence of drive signals is applied.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically written areas to carry ticketing or financial information, however magnetically written data is not visible.

A structure is disclosed in PCT/WO 97/04398, entitled "Electronic Book With Multiple Display Pages" which is a thorough recitation of the art of thin, electronically written display technologies. Disclosed is the assembling of multiple display sheets that are bound into a "book", each sheet can be individually addressed. The patent recites prior art in forming thin, electronically written pages, including flexible sheets, image modulating material formed from a bi-stable liquid crystal system, and thin metallic conductor lines on each page.

Fabrication of flexible, electronically written display sheets are disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operate on the liquid crystal material to expose display areas. The display uses nematic liquid crystal material that ceases to present an image when de-energized.

U.S. Pat. No. 5,437,811 discloses a light-modulating cell having a polymer dispersed chiral nematic liquid crystal. The chiral nematic liquid crystal has the property of being driven between a planar state reflecting a specific visible wavelength of light and a light scattering focal conic state. The structure has the capacity of maintaining one of the given states in the absence of an electric field.

U.S. Pat. No. 3,816,786 discloses a layer of encapsulated cholesteric liquid crystal responsive to an electric field. The conductors in the patent can be transparent or non-transparent and formed of various metals or graphite. It is disclosed that one conductor must be light absorbing and it is suggested that the light absorbing conductor be prepared from paints containing conductive material such as carbon.

U.S. Pat. No. 5,289,301 discusses forming a conductive layer over a liquid crystal coating to form a second conductor. The description of the preferred embodiment discloses Indium-Tin-Oxide (ITO) over a liquid crystal dispersion to create a transparent conductor.

Cholesteric materials require one of the two conductors to be light absorbing and conductive. Materials have been proposed for the application including carbon or metal oxides to create a black and conductive surface for polymer dispersed cholesteric liquid crystal materials. Such coatings often backscatter light. Moreover, because there is inactive material between the conductors, it would be desirable to maximize the use of the inactive material.

U.S. Pat. No. 6,639,637 describes an opaque field-spreading layer for dispersed liquid crystal coatings that allow the electrical switching of material in the usually inactive regions (gaps) between the second conductors. U.S. Pat. No. 6,707,517 describes a transparent field-spreading layer for dispersed liquid crystal coatings that allow the electrical switching of material in gaps between the first conductors. Although field-spreading layers and state switching of gap material was demonstrated, the sequence of signals necessary for switching the gaps in passive matrix displays into the most desired pattern of light and dark states was not recognized.

There are many means for driving cholesteric liquid crystals in a passive matrix. U.S. Pat. No. 5,644,330 teaches how to utilize the right slope of the electro-optical curves of chiral nematic liquid crystal. In addition, a clearing voltage is described that initializes the panel's reflective state. This clearing voltage can be sufficient to set the display into the focal conic texture. If the clearing voltage is high enough, the panel can be initialized into the stable planar texture. This prior art teaches that clearing the display before rewriting it assists in the removal of residual previous image. These drive methods, also referred to as drive schemes, can be described as conventional focal conic rest, right-slope select and conventional planar rest, right-slope select methods respectively.

Another drive method for cholesteric liquid crystals is pulse cumulative, as described in U.S. Pat. No. 6,133,895. In this method, a series of voltage pulses are applied to the display at a frequency approximately 60 Hz. A series of 6 or 7 voltage pulses cumulatively change the reflectance state of the pixel in an array of pixels. Methods of this type can be characterized as pulse-accumulation right-slope select.

Dynamic drive methods are also well known in the art of driving chiral nematic liquid crystal displays. U.S. Pat. No. 5,748,277 describes a 3 phase dynamic drive scheme where the fast transition from homeotropic to the transient planar texture is leveraged for high speed chiral nematic liquid crystal writing. SID 2001 Digest, pp. 882-885 "Simple Drive Scheme for Bistable Cholesteric LCDs" (Rybalochka, et. al) teaches a simple dynamic drive method utilizing a pseudo 3-phase that requires only 2 voltage levels for row and column drivers. This method is known as the "U/√2" driving method. The symbol "√" is understood by those of skill in the art to indicate the square root. For example, √2 represents the square root of 2.

U.S. Patent Application 2005/0024307 A1 discloses yet another driving method for chiral nematic liquid crystal displays that follows a more conventional approach. The use of a high voltage planar reset pulse to the entire panel prior to writing the display, as well as use of the left slope of the electro-optic curve for cholesteric liquid crystal displays. This drive method applies a high voltage pulse followed by a low voltage series of pulses to specific pixels that are to be transitioned from the stable planar texture (established in the reset pulse) to focal conic. During the selection phase, the voltage across the pixels to be transitioned to the focal conic texture is greater than the voltage across the pixels that are to remain in the stable planar texture, which is the distinguishing characteristic of a left-slope drive method. Therefore, this method can be described as a planar reset, left-slope selection method.

It is the aim of this invention to describe image displays having field-spreading layers and the drive methods desired to image the displays having field-spreading layers to their best advantage.

Problem to be Solved

There is a need for bistable displays with improved contrast, which in turn produces a higher quality display.

SUMMARY OF THE INVENTION

The present invention relates to a bistable matrix-addressable display element comprising a substrate, a bistable electrically modulated imaging layer having a reflection maximum, at least one conductor, and at least one field-spreading layer between the bistable electrically modulated imaging layer and the at least one conductor, wherein the field-spreading layer has a sheet resistance (SER) of from $10^9$ to $10^6$ Ohms per square. The present invention also relates to a method of imaging the display comprising identifying an area to be updated of the bistable matrix-addressable display element, wherein the area to be updated comprises rows of pixels; and applying a sequence of drive signals having a 4-phase approach to image the bistable matrix-addressable display element, wherein the 4-phase approach comprises in phase 1, applying a first pixel voltage across the pixels of the area to be updated such that the critical voltage is reached, holding the first pixel voltage until a homeotropic texture is reached; in phase 2, setting a second pixel voltage to allow the homeotropic texture to relax into a stable planar texture; in phase 3, selecting one row of pixels of the rows of pixels of the area to be updated, updating this one row of pixels by addressing, wherein addressing comprises applying a third pixel voltage, capable of switching the pixels from the stable planar texture to the non-reflective focal conic texture, across the pixels to produce switched pixels; and applying a fourth pixel voltage, incapable of switching the pixels from the stable planar texture to the non-reflective focal conic texture, to produce unswitched pixels to remain in the stable planar texture; and repeating the addressing until the rows of pixels of the area to be updated have been addressed; and, in phase 4, removing the first pixel voltage, the second pixel voltage, the third pixel voltage, and the fourth pixel voltage from the area of the bistable matrix-addressable display element to be updated.

Advantageous Effect of the Invention

The present invention includes several advantages, not all of which are incorporated in a single embodiment. The present invention provides a display in which the gaps between conductive electrodes are imaged as desired in light and dark areas, resulting in improved contrast. When utilized in combination with a particular driver, contrast is enhanced further. The field-spreading also results in a display which operates with reduced voltage.

DETAILED DESCRIPTION OF THE INVENTION

The present invention relates to a display element comprised of a substrate, an electrically modulated imaging layer, a conductor disposed between the substrate and the imaging layer, and a field-spreading layer. Optionally, the display may include a second conductor on the side of the imaging layer opposite the first conductor. The invention also relates to a method of imaging the inventive display element.

The present invention utilizes a partially conductive field-spreading layer. The conductive character of the field-spreading layer may be characterized as incapable of shorting or directly carrying a field. The partially conductive field-spreading layer typically demonstrates a sheet resistance, also referred to as surface electrical resistance (SER), of less than $10^9$ Ohms/square, most typically in the range of from $10^9$ to $10^6$ Ohms per square. The field spreading character of the layer is provided by electronic conductors contained in the layer.

In the present invention, the first conductor, typically disposed between the substrate and the imaging layer, is patterned with non-conductive spaces between adjacent conductive areas. The conductive areas of the first conductor are referred to as columns and the non-conductive spaces between adjacent columns are referred to as column gaps. The second conductor also is patterned with non-conductive spaces between adjacent conductive areas. The conductive areas of the second conductor are referred to as rows and the non-conductive spaces between adjacent rows are referred to as row gaps. The field-spreading layer has a sheet resistance, also referred to as surface electrical resistance (SER), capable of spreading an applied field across the width of adjacent column or row gaps.

Figure 2:
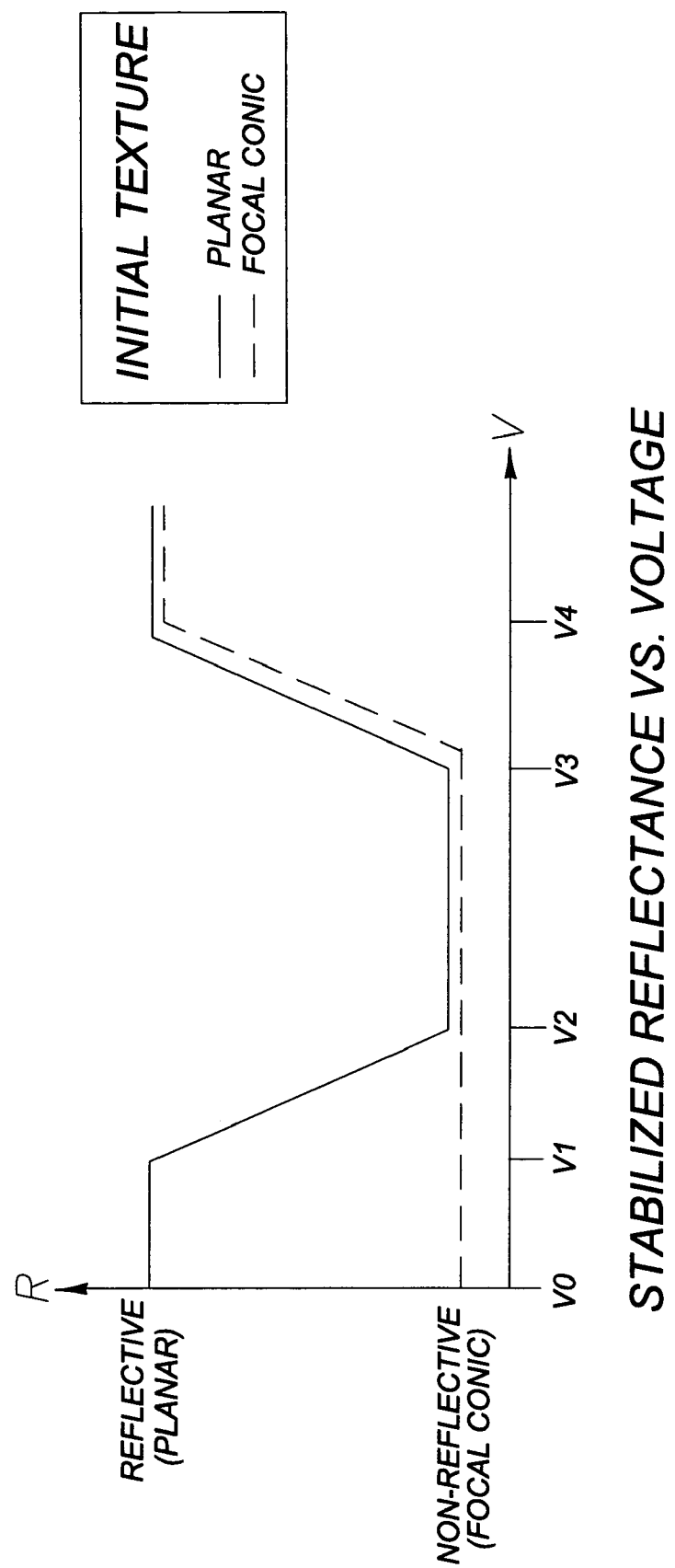
FIG. 2 illustrates characteristic curves.

To image the display, electrical signals corresponding to a reset phase are followed by a relaxation phase and a selection phase and where, in the reset phase followed by the relaxation phase, the rows and columns are energized with pulse sequences that leaves the display in a fully reflective state and where, in the selection phase, each row is addressed such that pixels that are to be switched from the reflective texture to the non-reflective texture receive a pixel voltage pulse or set of pulses across them in the range between V2 and V3 while pixels that are to remain in the stable reflective state receive a pulse or set of pulses in the range between V0 and V1 that have negligible effect on the final texture of the pixel. The row may preferably be sequentially addressed. Exemplary values for V0, V1, V2, V3 and V4 are shown in FIG. 2. For purposes of the present invention, V4 represents a threshold voltage, frequently referred to as the critical voltage, related to the electro-optical characteristic curve. V0 represents the voltage at ground, where voltage equals 0 (zero) volts. V1 represents the highest voltage pulse applied which does not significantly change or disturb the planar texture of the imaging layer. For purposes of the present invention, a 1% or greater change is considered significant. V2 represents the lowest voltage that can be applied to move to within 1% of pure, that is, maximum, focal conic texture. In FIG. 2, this would be the lowest point on the electro-optical characteristic curve. V3 represents the highest voltage which results in not significant change or disturbance from focal conic texture. V4 represents the minimum voltage required to convert the focal conic texture back to the planar texture, that is, the minimum voltage required to drive the liquid crystal to a homeotropic state. The voltage reduction achieved by the present invention over the prior art relates to the value of V4. These voltages are also referred to as pixel voltages. Pixel voltages are defined herein as the difference between the row voltage and the column voltage.

Electronic conductors such as conjugated conducting polymers, conducting carbon particles, crystalline semiconductor particles, amorphous semiconductive fibrils, and continuous conductive metal or semiconducting thin films can be used in this field-spreading layer. Useful conductors may also include ionic conductors, provided that the ionic conductor can be substantially confined to the field-spreading layer. Of the various types of electronic conductors, electronically conductive metal-containing particles, such as semiconducting metal oxides, and electronically conductive polymers, such as, substituted or unsubstituted polythiophenes, substituted or unsubstituted polypyrroles, and substituted or unsubstituted polyanilines are particularly effective for the present invention.

Conductive metal-containing particles, which may be used in the present invention include conductive crystalline inorganic oxides, conductive metal antimonates, and conductive inorganic non-oxides. Crystalline inorganic oxides may be chosen from zinc oxide, titania, tin oxide, alumina, indium oxide, silica, magnesia, barium oxide, molybdenum oxide, tungsten oxide, and vanadium oxide or composite oxides thereof, as described in, e.g., U.S. Pat. Nos. 4,275,103, 4,394,441, 4,416,963, 4,418,141, 4,431,764, 4,495,276, 4,571,361, 4,999,276 and 5,122,445, all incorporated herein by reference. The conductive crystalline inorganic oxides may contain a "dopant" in the range from 0.01 to 30 mole percent, preferred dopants being aluminum or indium for zinc oxide, niobium or tantalum for titania, and antimony, niobium or halogens for tin oxide. Alternatively, the conductivity can be enhanced by formation of oxygen defects by methods well known in the art. The use of antimony-doped tin oxide at an antimony doping level of at least 8 atom percent and having an X-ray crystallite size less than 100 Å and an average equivalent spherical diameter less than 15 nm but no less than the X-ray crystallite size as taught in U.S. Pat. No. 5,484,694 is specifically contemplated and incorporated herein by reference.

Particularly useful electronically conductive metal-containing particles, which may be used in the field-spreading layer, include acicular-doped metal oxides, acicular metal oxide particles, and acicular metal oxides containing oxygen deficiencies. In this category, acicular doped tin oxide particles, particularly acicular antimony-doped tin oxide particles, acicular niobium-doped titanium dioxide particles, and the like are preferred because of their availability. The aforesaid acicular conductive particles preferably have a cross-sectional diameter less than or equal to 0.02 mm and an aspect ratio greater than or equal to 5:1. Some of these acicular conductive particles, useful for the present invention, are described in U.S. Pat. Nos. 5,719,016, 5,731,119, 5,939,243, incorporated herein by reference, and references therein.

The invention is also applicable where the conductive agent comprises a conductive "amorphous" gel such as vanadium oxide gel comprised of vanadium oxide ribbons or fibers. Such vanadium oxide gels may be prepared by any variety of methods, including but not specifically limited to melt quenching as described in U.S. Pat. No. 4,203,769, incorporated herein by reference, ion exchange as described in DE 4,125,758, incorporated herein by reference, or hydrolysis of a vanadium oxoalkoxide as claimed in WO 93/24584, incorporated herein by reference. The vanadium oxide gel is preferably doped with silver to enhance conductivity. Other methods of preparing vanadium oxide gels which are well known in the literature include reaction of vanadium or vanadium pentoxide with hydrogen peroxide and hydrolysis of VO2 OAc or vanadium oxychloride.

Conductive metal antimonates suitable for use in accordance with the invention include those as disclosed in, U.S. Pat. Nos. 5,368,995 and 5,457,013, for example, incorporated herein by reference. Preferred conductive metal antimonates have a rutile or rutile-related crystallographic structures and may be represented as $M+2$ $Sb+5_2$ $O_6$ (where $M+2=Zn+2$, $Ni+2$, $Mg+2$, $Fe+2$, $Cu+2$, $Mn+2$, $Co+2$) or $M+3$ $Sb+5$ $O_4$ (where $M+3=In+3$, $Al+3$, $Sc+3$, $Cr+3$, $Fe+3$). Several colloidal conductive metal antimonate dispersions are commercially available from Nissan Chemical Company in the form of aqueous or organic dispersions. Alternatively, U.S. Pat. Nos. 4,169,104 and 4,110,247, both incorporated herein by reference, teach a method for preparing $M+2$ $Sb+5_2$ $O_6$ by treating an aqueous solution of potassium antimonate with an aqueous solution of an appropriate metal salt (e.g., chloride, nitrate, sulfate) to form a gelatinous precipitate of the corresponding insoluble hydrate which may be converted to a conductive metal antimonate by suitable treatment.

Conductive inorganic non-oxides suitable for use as conductive particles in the present invention include metal nitrides, metal borides and metal silicides, which may be acicular or non-acicular in shape. Examples of these inorganic non-oxides include titanium nitride, titanium boride, titanium carbide, niobium boride, tungsten carbide, lanthanum boride, zirconium boride, molybdenum boride and the like. Examples of conductive carbon particles, include carbon black and carbon fibrils or nanotubes with single walled or multi-walled morphology. Example of such suitable conductive carbon particles can be found in U.S. Pat. No. 5,576,162, incorporated herein by reference, and references therein.

Suitable electrically conductive polymers that are preferred for incorporation in the antistatic layer used with the invention are specifically electronically conducting polymers, such as those illustrated in U.S. Pat. Nos. 6,025,119, 6,060,229, 6,077,655, 6,096,491, 6,124,083, 6,162,596, 6,187,522, and 6,190,846, all incorporated herein by reference. These electronically conductive polymers include substituted or unsubstituted aniline-containing polymers (as disclosed in U.S. Pat. Nos. 5,716,550, 5,093,439 and 4,070,189, incorporated herein by reference), substituted or unsubstituted thiophene-containing polymers (as disclosed in U.S. Pat. Nos. 5,300,575, 5,312,681, 5,354,613, 5,370,981, 5,372, 924, 5,391,472, 5,403,467, 5,443,944, 5,575,898, 4,987,042 and 4,731,408, all incorporated herein by reference), substituted or unsubstituted pyrrole-containing polymers (as disclosed in U.S. Pat. Nos. 5,665,498 and 5,674,654, both incorporated herein by reference), and poly(isothianaphthene) or derivatives thereof. These conducting polymers may be soluble or dispersible in organic solvents or water or mixtures thereof. Preferred conducting polymers for the present invention include polypyrrole styrene sulfonate (referred to as polypyrrole/poly (styrene sulfonic acid) in U.S. Pat. No. 5,674,654, incorporated herein by reference), 3,4-dialkoxy substituted polypyrrole styrene sulfonate, and 3,4-dialkoxy substituted polythiophene styrene sulfonate because of their color. The most preferred substituted electronically conductive polymers include poly(3,4-ethylene dioxythiophene styrene sulfonate), such as Baytron â P supplied by Bayer Corporation, for its apparent availability in relatively large quantity.

Other materials may be included in the field-spreading layer. For example, the field-spreading layer may also contain a colorant to produce a color contrast field-spreading layer. Preferably, the colorant will provide a contrasting color to the reflection maximum of the nearby bistable electrically modulated imaging layer.

The field-spreading layers may be applied to the support or other layers of the display by any method known by those of skill in the art to form a layer. Some exemplary methods may include screen printing, hopper coating, gravure printing, lithographic and photolithographic printing, spraying, vapor depositing, dip coating, rod coating, blade coating, air knife coating, gravure coating and reverse roll coating, extrusion coating, slide coating, curtain coating, and the like. The field-spreading layer may be applied simultaneously with other layers, sequentially to other layers, or in any combination of simultaneous and sequential application.

Figure 4:
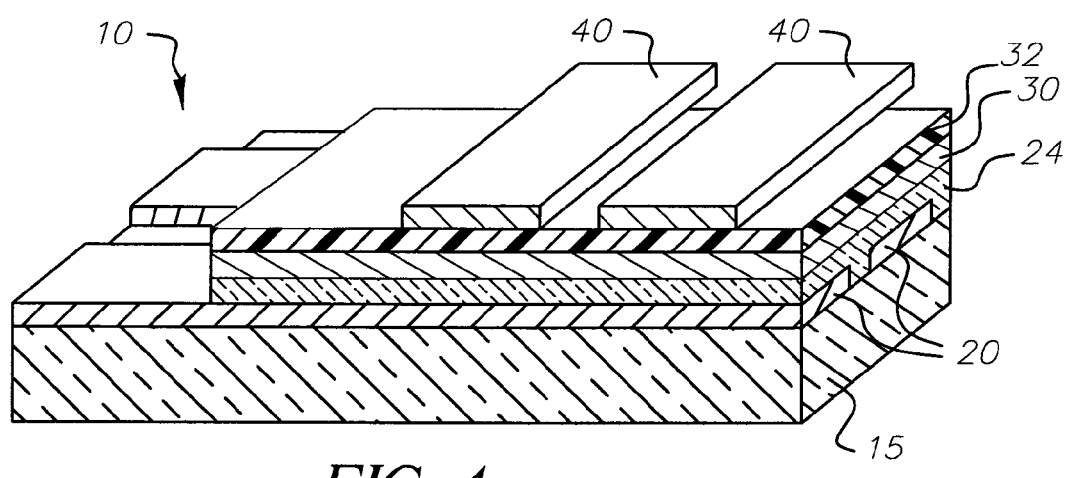
FIG. 4 illustrates another embodiment of a passive matrix display cross section.

FIG. 4 is a sectional view of an exemplary display sheet according to the present invention having polymer dispersed cholesteric layer 30 in accordance with the present invention. A transparent field-spreading layer 24 is disposed between first conductors 20 and polymer dispersed cholesteric layer 30. The transparent organic conductor can be Baytron B polythiophene suspension from Agfa-Gevaert N. V. of Morsel, Belgium. For an experimental coating, field-spreading layer 24 can be 1.0 weight percent deionized gelatin and 1.0 weight percent sub-micron (nanoparticle) polythiophene coated over first conductors 20 at a 25 micron wet thickness. The dried transparent field-spreading layer 24 will be approximately 0.4 microns thick. The resulting transparent field-spreading layer 24 is functionally transparent and has a sheet resistance, also referred to as surface electrical resistance (SER), of over one mega-Ohms per square. The resulting coating is functionally non-conductive compared to adjacent first conductors 20. Transparent field-spreading layer 24 can activate cholesteric liquid crystal material past the edge of a field-carrying electrode. In making sheet 10, the sheet can be in the form of a web that is sequentially moved through one or more stations which sequentially or simultaneously deposits the state changing layer 30 or transparent field-spreading layer 24.

In one embodiment, at least one imageable layer is applied to the support. The imageable layer can contain an electrically imageable material. The electrically imageable material can be light emitting or light modulating. Light emitting materials can be inorganic or organic in nature. Particularly preferred are organic light emitting diodes (OLED) or polymeric light emitting diodes (PLED). The light modulating material can be reflective or transmissive. Light modulating materials can be electrochemical, electrophoretic, such as Gyricon particles, electrochromic, or liquid crystals. The liquid crystalline material can be twisted nematic (TN), super-twisted nematic (STN), ferroelectric, magnetic, or chiral nematic liquid crystals. Especially preferred are chiral nematic liquid crystals. The chiral nematic liquid crystals can be polymer dispersed liquid crystals (PDLC). Structures having stacked imaging layers or multiple support layers, however, are optional for providing additional advantages in some case.

In a preferred embodiment, the electrically imageable material can be addressed with an applied electric field and then retain its image after the electric field is removed, a property typically referred to as "bistable". Preferred bistable electrically modulated imaging layers are field or voltage driven switching layer. Particularly suitable electrically imageable materials that exhibit "bistability" are electrochemical, electrophoretic, such as Gyricon particles, electrochromic, magnetic, or chiral nematic liquid crystals. Especially preferred are chiral nematic liquid crystals. The chiral nematic liquid crystals can be polymer dispersed liquid crystals (PDLC).

The electrically modulated material may also be a printable, conductive ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from about 30 to about 300 microns. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. Nos. 6,147,791, 4,126,854 and 6,055,091, the contents of which are herein incorporated by reference.

According to one practice, the microcapsules may be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material. According to a preferred embodiment, the particle diameters of the microcapsules are between about 5 microns and about 200 microns, and the particle diameters of the charged particles are between about one-thousandth and one-fifth the size of the particle diameters of the microcapsules.

Further, the electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through.

The electrically modulated material may also include surface stabilized ferrroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material display material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of non-electrically modulated material based materials that have the previously listed radiation absorbing or emitting characteristics. The electrically modulated material employed in connection with the present invention preferably has the characteristic that it does not require power to maintain display of indicia.

Figure 1:
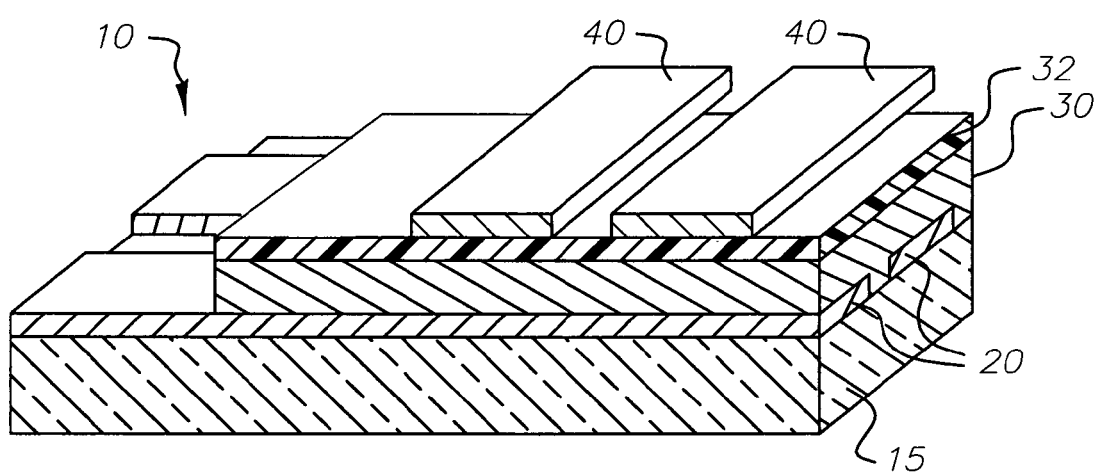
FIG. 1 illustrates an embodiment of a passive matrix display structure cross section.

Most preferred is a support bearing a conventional polymer dispersed light modulating material. The liquid crystal (LC) is used as an optical switch. The supports are usually manufactured with transparent, conductive electrodes, in which electrical "driving" signals are coupled. The driving signals induce an electric field which can cause a phase change or state change in the liquid crystal material, the liquid crystal exhibiting different light reflecting characteristics according to its phase and/or state As used herein, a "liquid crystal display" (LCD) is a type of flat panel display used in various electronic devices. At a minimum, a liquid crystal display (LCD) comprises a substrate, at least one conductive layer and a liquid crystal layer. Liquid crystal displays may also comprise two sheets of polarizing material with a liquid crystal solution between the polarizing sheets. The sheets of polarizing material may comprise a substrate of glass or transparent plastic. The liquid crystal display may also include functional layers. In one embodiment of an LCD 10, illustrated in FIG. 1, a transparent, multilayer flexible support 15 is coated with a first conductive layer 20, which may be patterned, onto which is coated the light modulating liquid crystal layer 30. A field-spreading layer 32 is coated on the light modulating layer and a second patterned conductive layer 40 is applied.

In another embodiment of a liquid crystal display 10, illustrated in FIG. 4, a transparent, multilayer flexible support 15 is coated with a first conductive layer 20, which may be patterned, onto which is coated a field-spreading layer 24 followed by a light modulating liquid crystal layer 30. Layer 32 can be a color contrasting layer or a field-spreading layer which is applied on the light modulating layer. A second patterned conductive layer 40 can then be applied.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, the liquid crystal exhibiting different light reflecting characteristics according to its phase and/or state.

Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

Chiral nematic liquid crystal refers to the type of liquid crystal having finer pitch than that of twisted nematic and super-twisted nematic used in commonly encountered liquid crystal devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known liquid crystal display devices include chemically etched, transparent, conductive layers overlying a glass substrate as described in U.S. Pat. No. 5,667,853, incorporated herein by reference.

In one embodiment, a chiral nematic liquid crystal composition may be dispersed in a continuous matrix. Such materials are referred to as "polymer dispersed liquid crystal" materials or "PDLC" materials. Such materials can be made by a variety of methods. For example, Doane et al. (*Applied Physics Letters*, 48, 269 (1986)) disclose a PDLC comprising approximately 0.4 µm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

The contrast of the display is degraded if there is more than a substantial monolayer of N*LC domains. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

In a typical matrix-addressable light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode can be formed over the electrode layers. For example, in U.S. Pat. No. 5,703,436 to Forrest et al., incorporated herein by reference, transparent indium tin oxide (ITO) is used as the hole injecting electrode, and a Mg—Ag—ITO electrode layer is used for electron injection. For purposes of the present invention, matrix-addressable refers to displays which are patterned and typically use rows and columns to produce pixels to form a pattern. However, the present use also includes patterns such as icons and characters as well as segmented displays.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxyiic acid and of cyclohexylcyclohexanecarboxylic acid; phenyl cyclohexanes; cyclohexylbiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyldioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y—Z—R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc-; wherein Phe is unsubstituted or fluorine substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl) ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2-CH2-, —CO—O—, —CH2-O—, —CO—S—, —CH2-S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, *Mol. Cryst. Liq. Crys.*, 123, 377 (1985); G. Spada and G. Proni, *Enantiomer*, 3, 301 (1998) and references therein. Typical well known dopant classes include 1,1-binaphthol derivatives; isosorbide and similar isomannide esters as disclosed in U.S. Pat. No. 6,217,792; TADDOL derivatives as disclosed in U.S. Pat. No. 6,099,751; and the pending spiroindanes esters as disclosed in U.S. patent application Ser. No. 10/651,692 by T. Welter et al., filed Aug. 29, 2003, titled "Chiral Compounds And Compositions Containing The Same," hereby incorporated by reference.

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP.c)$$

where c is the concentration of the chiral dopant and HTP is the proportionality constant.

For some applications, it is desired to have liquid crystal mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

Chiral nematic liquid crystal materials and cells, as well as polymer stabilized chiral nematic liquid crystals and cells, are well known in the art and described in, for example, U.S. application Ser. No. 07/969,093 and Ser. No. 08/057,662; Yang et al., Appl. Phys. Lett. 60(25) pp 3102-04 (1992); Yang et al., J. Appl. Phys. 76(2) pp 1331 (1994); published International Patent Application No. PCT/US92/09367; and published International Patent Application No. PCT/US92/03504, all of which are incorporated herein by reference.

In a preferred embodiment, a light modulating layer is deposited over a first conductor. The light modulating layer contains a chiral nematic liquid crystal. The selected material preferably exhibits high optical and electrical anisotropy and matches the index of refraction of the carrier polymer, when the material is electrically oriented. Examples of such materials are E. Merck's BL-03, BL-048 or BL-033, which are available from EM Industries of Hawthorne, N.Y. Other light reflecting or diffusing modulating, electrically operated materials can also be coated, such as a micro-encapsulated electrophoretic material in oil.

The liquid crystal can be a chiral doped nematic liquid crystal, also known as cholesteric liquid crystal, such as those disclosed in U.S. Pat. No. 5,695,682, incorporated herein by reference. Application of fields of various intensity and duration change the state of chiral doped nematic materials from a reflective to a transmissive state. These materials have the advantage of maintaining a given state indefinitely after the field is removed. Cholesteric liquid crystal materials can be Merck BL112, BL118 or BL126 that are available from EM Industries of Hawthorne, N.Y. The light modulating layer is effective in two conditions.

Liquid crystal domains may be preferably made using a limited coalescence methodology, as disclosed in U.S. Pat. Nos. 6,556,262 and 6,423,368, incorporated herein by reference. Limited coalescence is defined as dispersing a light modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

An immiscible, field responsive light modulating material along with a quantity of colloidal particles is dispersed in an aqueous system and blended to form a dispersion of field responsive, light modulating material below a coalescence size. When the emulsion, also referred to herein as a dispersion, is dried, a coated material is produced which has a set of uniform domains having a plurality of electrically responsive optical states. The colloidal solid particle, functioning as an emulsifier, limits domain growth from a highly dispersed state. Uniformly sized liquid crystal domains are created and machine coated to manufacture light modulating, electrically responsive sheets with improved optical efficiency.

Specifically, a liquid crystal material may be dispersed an aqueous bath containing a water soluble binder material such as deionized gelatin, polyvinyl alcohol (PVA) or polyethylene oxide (PEO). Such compounds are machine coatable on equipment associated with photographic films. Preferably, the binder has a low ionic content, as the presence of ions in such a binder hinders the development of an electrical field across the dispersed liquid crystal material. Additionally, ions in the binder can migrate in the presence of an electrical field, chemically damaging the light modulating layer. The liquid crystal/gelatin emulsion is coated to a thickness of between 5 and 30 microns to optimize optical properties of light modulating layer. The coating thickness, size of the liquid crystal domains, and concentration of the domains of liquid crystal materials are designed for optimum optical properties.

In an exemplary embodiment, a liquid crystalline material is homogenized in the presence of finely divided silica, a coalescence limiting material, (LUDOX® from duPont Corporation). A promoter material, such as a copolymer of adipic acid and 2-(methylamino) ethanol, is added to the aqueous bath to drive the colloidal particles to the liquid-liquid interface. The liquid crystal material is dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy) approximately 1, 3, and, 8 micron were produced. These emulsions were diluted into gelatin solution for subsequent coating.

Domains of a limited coalescent material maintain their uniform size after the addition of the surfactant and after being machine coated. There were few, if any, parasitic domains having undesirable electro-optical properties within the dried coatings produced by the limited coalescence method. Coatings made using limited coalescence having a domain size of about 2 microns may have the greatest translucence. For constant material concentrations and coating thickness, limited coalescent materials having a domain size of about 2 microns in size are significantly more translucent than any sized domains formed using conventional dispersion.

Sheets made by the limited coalescence process have curves similar to those of conventionally dispersed materials. However, with 8 to 10 micron domains, the material may demonstrate reduced scattering due to the elimination of parasitic domains. Conventionally dispersed cholesteric materials contain parasitic domains, which reflect light in wavelengths outside the wavelengths reflected by the cholesteric material. Limited coalescent dispersions have reduced reflection in other wavelengths due to the elimination of parasitic domains. The increased purity of color is important in the development of full color displays requiring well separated color channels to create a full color image. Limited coalescent cholesteric materials provide purer light reflectance than cholesteric liquid crystal material dispersed by conventional methods. Such materials may be produced using conventional photographic coating machinery.

In order to provide suitable formulations for applying a layer containing the liquid crystal domains, the dispersions are combined with a hydrophilic colloid, gelatin being the preferred material. Surfactants may be included with the liquid crystal dispersion prior to the addition of gelatin in order to prevent the removal of the particulate suspension stabilizing agent from the droplets. This aids in preventing further coalescence of the droplets.

As for the suspension stabilizing agents that surround and serve to prevent the coalescence of the droplets, any suitable colloidal stabilizing agent known in the art of forming polymeric particles by the addition reaction of ethylenically unsaturated monomers by the limited coalescence technique can be employed, such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; copolymers such as copoly(styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent.

Suitable hydrophilic binders include both naturally occurring substances such as proteins, protein derivatives, cellulose derivatives (e.g. cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

The flexible plastic substrate can be any flexible self supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 300-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly (methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains UV cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

In one embodiment, a sheet supports a conventional polymer dispersed light modulating material. The sheet includes a substrate. The substrate may be made of a polymeric material, such as Kodak Estar film base formed of polyester plastic, and have a thickness of between 20 and 200 microns. For example, the substrate may be an 80 micron thick sheet of transparent polyester. Other polymers, such as transparent polycarbonate, can also be used. Alternatively, the substrate 15 may be thin, transparent glass.

The liquid crystal display contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation, incorporated herein by reference. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.), incorporated herein by reference. Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin oxide or indium-tin oxide (ITO), or polythiophene, with ITO being the preferred material. Typically, the conductive layer is sputtered onto the substrate to a resistance of less than 300 Ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 Ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10-120 nm in thickness, or 50-100 nm thick to achieve a resistivity of 20-60 Ohms per square on plastic. An exemplary preferred ITO layer is 60-80 nm thick.

The conductive layer is preferably patterned. The conductive layer is preferably patterned into a plurality of electrodes. The patterned electrodes may be used to form a liquid crystal display device. In another embodiment, two conductive substrates are positioned facing each other and cholesteric liquid crystals are positioned therebetween to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium-tin oxide, resulting in the layer being transparent. Alternatively, second conductive layer may be printed conductive ink.

For higher conductivities, the second conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation, incorporated herein by reference. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

In addition to a second conductive layer, other means may be used to produce a field capable of switching the state of the liquid crystal layer as described in, for example, U.S. Pat Appl. Nos. 20010008582 A1, 20030227441 A1, 20010006389 A1, and U.S. Pat. Nos. 6,424,387, 6,269,225, and 6,104,448, all incorporated herein by reference.

The liquid crystal display may also comprises at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled non-conductive pigments. The materials are milled below 1 micron to form "nano-pigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolopyrrole, and thioindigo, and anthriquinone pigments such as anthrapyrimidine.

The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, the liquid crystal exhibiting different light reflecting characteristics according to its phase and/or state. Passive matrix displays, having one or more field-spreading layers, while improving contrast over prior art elements, do not achieve the best contrast unless the correct sequence of drive signals is applied.

The preferred drive method for the invention involves a 4-phase approach. In the first phase, the area of the display to be updated is reset to a planar texture. Referring to FIG. 2, an AC pixel voltage is applied across the pixels such that the critical voltage is reached if not exceeded. The duration of the AC pixel voltage is held for a period suitable to achieve the homeotropic texture. In phase 2, the pixel voltage of the display is set to substantially low voltage to allow the homeotropic domains of the liquid crystal material to relax to the stable planar texture. Phase 3 is the scanning phase, where each row of the display to be updated is addressed, preferably sequentially addressed. When the row is addressed, it is said to be "selected," while any other row is said to be non-selected. In the selected row, pixels that are to be switched from the stable planar texture to the non-reflective focal conic texture receive a pixel voltage pulse across them greater than V1 to produce the planar to focal conic (P-FC) transition. Pixels that are to remain in the stable planar texture receive a pulse or set of pulses such that there is negligible effect on the final texture of the pixel, which is stable planar. After the pixel voltage pulse or pulses have sufficiently caused the planar-focal conic transition to select pixels in the selected row, the next row to be addressed is selected. The selection process is repeated until all rows have been addressed. This drive method or scheme can be described as a planar reset, left-slope selection method. Finally, all pixel voltages are removed from the updated area of the display.

Specifically, FIG. 2 represents the stabilized reflectance of chiral nematic liquid crystal after the applied voltage has been removed and the chiral nematic liquid crystal is allowed to obtain a stable texture. This graph is typically obtained by first applying an AC pixel voltage for a fixed period of time to reset the display to a known texture, either focal conic or homeotropic. Following the reset period is a period where the display is allowed to stabilize into the initial texture. After the display has stabilized, an AC test voltage is applied to the chiral nematic liquid crystal for a fixed period of time and then removed. After a brief period of relaxation/stablization time, the reflectance of the chiral nematic liquid crystal is measured. A reset to the initial condition must be performed for every test voltage on the x-axis.

The following examples are provided to illustrate the invention.

EXAMPLE DISPLAY 1

A 30 pixel per inch passive matrix display was created as follows. Five inch wide polyethylene terephthalate support, having 300 Ohm per square ITO, (Bekaert Specialty Films) was patterned across the web with a focused laser beam to produce 30 pixel per inch columns separated by about 100 micron gaps.

A dispersion of the chiral nematic composition was prepared as follows. To 248 grams of distilled water was added 3.7 grams of Ludox® colloidal silica suspension and 7.6 grams of a 10% w/w aqueous solution of a copolymer of methylaminoethanol and adipic acid. To this was added 111 grams of the appropriate amount of liquid crystal BL118 obtained from Merck, Darmstadt, Germany. The mixture was stirred using a Silverson®mixer at 5000 rpm. It was then passed twice through a Microfluidizer® at 3000 psi. Three hundred and seventy grams of the resulting dispersion was mixed with 962 grams of an aqueous solution containing 6.8% w/w alkali treated gelatin at 50° C. The dispersion (8% w/w liquid crystal material and 5% w/w gelatin) was stored in a refrigerator until further use. Microscopic examination showed that the dispersion consisted of uniform 8 μm droplets of the liquid crystal material in an aqueous gelatin medium.

The dispersion was warmed back to 40 degrees C. then knife coated onto the laser etched support to give a coverage of 92.2 $cm^3/m^2$ (8.57 $cm^3/ft^2$) for the liquid crystal material. The coatings were allowed to dry.

To form a color contrast field-spreading layer, the following materials were mixed together and applied over the dried liquid crystal layer. A Baytron P HC V2 (obtained from H.C. Starck Inc, Newton, Mass.,) solution in water was pH adjusted using Triethylamine (CAS 121-44-8) from approximately 2.0 to a pH range of 5 to 7 and heated to 40 degrees Celsius. Photographic gelatin was added to deionized water to make a 2% solution by weight and heated to 40 degrees Celsius. The solution was then placed into a 40 degree Celsius temperature bath and to this the gelatin and water mixture was slowly added. Once the mixture was homogenized a combination of magenta and cyan non-conductive pigments milled to less than 1 micron in size was added to the solution. To aid in the coating process, the total mixture was diluted to 1.75% gel. The Baytron P HC V2 constituted about 4% of the final dry coverage of this layer after coating and drying.

Control Display 1

A control passive matrix display was prepared exactly as described in example 1 except that the Baytron P HC V2 was left out of the contrasting color mixture.

Imaging the Displays

Figure 3A:
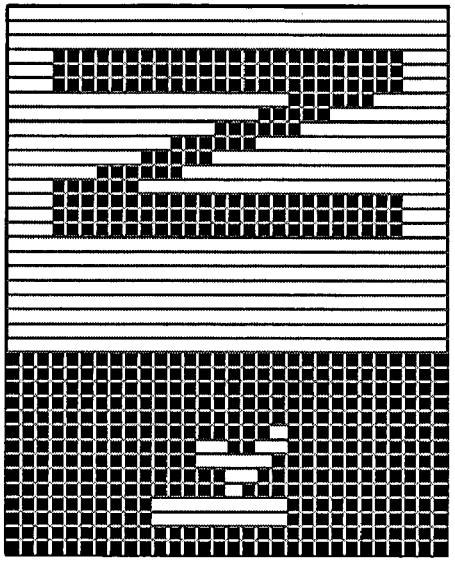
FIG. 3 illustrates the desired and undesirable gap reflection conditions.
Figure 3B:
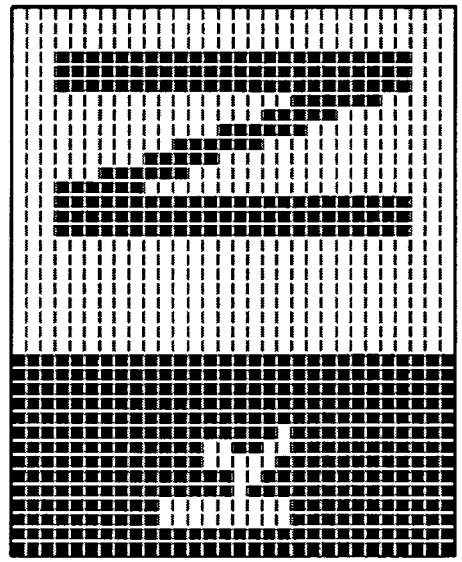
Figure 3C:
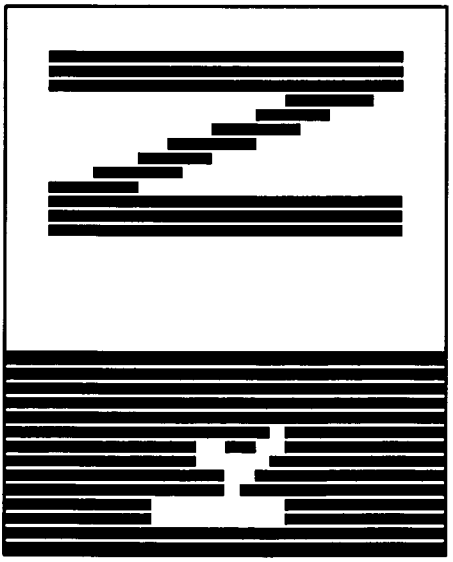
Figure 3D:
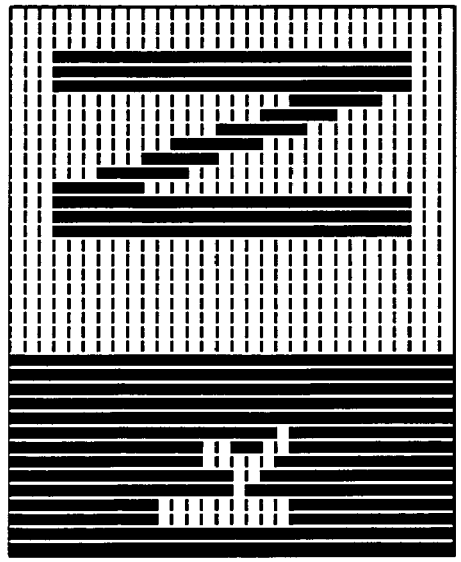

The control and example displays were written using drive methods as enumerated in Table 1. Voltage levels and timing sequences were adjusted to produce a good image on the control display for each drive method. With the control display, the liquid crystal in the gaps, as coated, was primarily in the planar state before imaging and remained in the planar state after imaging regardless of the drive method used. The same signals were then applied to the display having the field-spreading layer. In all cases good contrast was achieved within the pixels of the displays. Table 1 and FIG. 3 summarize the results for the gap states between planar pixels (light state neighbors) and between focal conic pixels (dark state neighbors), with the displays having a field-spreading layer. FIG. 3 shows a portion of the imaged display after the display was driven with various drive methods. FIG. 3a illustrates the desired gap reflectivity states, where the state between neighboring light pixels is light, and the state between neighboring dark pixels is dark. FIGS. 3b, 3c and 3d illustrate the undesirable gap reflective states. In FIG. 3b, the gap state is reflective regardless of the pixel state. FIG. 3c shows the dark gaps everywhere, regardless of the reflectivity of the pixels. FIG. 3d illustrates the opposite of the desired gap states, where the gaps are light between dark pixels, and dark between light pixels.

Drive method 1 in Table 1 follows a conventional drive method. The entire display panel was first reset into the focal conic texture by applying a 90V AC 250 Hz square wave between rows and columns for a period of 100 milliseconds (ms). Following the reset was a relaxation period of zero volts across the entire display panel for 200 ms. The next phase involves updating the display line by line by addressing each row as a selected row. All other rows are considered non-selected. The selection method utilizes the right slope of the electro-optical response curve shown in FIG. 2. The pixels in the selected row receive an AC voltage between the row and columns for period of 40 ms at a frequency of 250 Hz. 140 V was applied to the pixels in the selected row that were to obtain the final stable planar texture. For pixels in the selected row to remain in the focal conic texture, 90 V was applied. Pixels in the non-selected rows experienced an AC voltage of 25 V at a frequency of 250 Hz for the duration of the updating process. After all rows have been addressed, all voltages were removed from the display panel, allowing all pixels to stabilize into their final reflective states. The display image and resulting gap states are shown in FIG. 3c.

Drive method 2 in Table 1 follows a conventional drive method as well. The entire display panel was first reset into the planar texture by applying a 150 V AC 250 Hz square wave between rows and columns for a period of 100 ms. Following the reset was a relaxation period of zero volts across the entire display panel for 200 ms. The next phase involves updating the display line by line by addressing each row as a selected row. All other rows are considered non-selected. The selection method utilizes the right slope of the electro-optical response curve shown in FIG. 2. The pixels in the selected row receive an AC voltage between the row and columns for period of 40 ms at a frequency of 250 Hz. 130 V was applied to the pixels in the selected row that were to obtain the final stable planar texture. For pixels in the selected row to remain in the focal conic texture, 80 V was applied. Pixels in the non-selected rows experienced an AC voltage of 25 V at a frequency of 250 Hz for the duration of the updating process. After all rows have been addressed, all voltages were removed from the display panel, allowing all pixels to stabilize into their final reflective states. The display image and resulting gap states are shown in FIG. 3d.

Drive method 3 in Table 1 follows a conventional pulse accumulation drive method. This method involves updating the display line by line by addressing each row as a selected row. All other rows are considered non-selected. The selection method utilizes the right slope of the electro-optical response curve shown in FIG. 2. The pixels in the selected row received a single AC voltage pulse cycle between the row and columns for period of 5 ms. 170 V was applied to the pixels in the selected row that were to obtain the final stable planar texture. For pixels in the selected row to switch to or remain in the focal conic texture, 120 V was applied. Pixels in the non-selected rows experienced an AC voltage of 25 V at a frequency of 200 Hz for the duration of the updating process. After all rows had been addressed, the display update process was repeated 5 more times, allowing pixels in the display to cumulatively transition from their initial texture to their final texture. After the $6^{th}$ pass of display updates, all voltages were removed from the display panel, allowing all pixels to stabilize into their final reflective states. The display image and resulting gap states are shown in FIG. 3c.

Dynamic drive method 4 in Table 1 utilizes the referenced U/√2 drive method. This drive method utilizes only 2 drive voltages, U and 0, for both row and column. In this implementation, U was 120 V. In the first phase of the drive method, the entire display panel was first prepared into the homeotropic texture by applying the AC voltage U at 250 Hz for a period of 100 ms. The next phase of the drive method is the holding/selection phase. On a row-by-row basis, each row was addressed as the selected row, while all other rows were considered non-selected. Pixels in the selected row received a voltage of either U or 0 V at 100% duty cycle, which causes the chiral nematic liquid crystal domains to remain in the homeotropic texture or transition into the transient planar texture, respectively. The pixels to obtain the final stable planar texture received the voltage U, while pixel to transition into focal conic received the voltage of 0 V. The duration of the selection time was 1 ms. All pixels in the non-selected rows received a voltage of U at 50% duty cycle, which produces a local root mean square (RMS) voltage of U/√2. This voltage has the effect of either holding the chiral nematic liquid crystal domains in the homeotropic texture if they were previously in the homeotropic texture, or evolving them into the focal conic texture if they were previously in the transient planar texture. In order for the last few rows to transition correctly, an evolution phase was applied after all rows had been addressed. This consisted of applying a voltage of U at 50% duty cycle across the entire display panel for 15 ms. After the last evolution phase was performed, all voltages were removed from the display panel, allowing all pixels to stabilize into their final reflective states. The display image and resulting gap states are shown in FIG. 3b.

Drive method 5 in Table 1, the preferred method, follows a conventional drive method. The entire display panel was first reset into the planar texture by applying a 140 V AC 250 Hz square wave between rows and columns for a period of 100 ms. Following the reset was a relaxation period of zero volts across the entire display panel for 200 ms. The next phase involves updating the display line by line by addressing each row as a selected row. All other rows are considered non-selected. The selection method utilizes the left slope of the electro-optical response curve shown in FIG. 2. The pixels in the selected row receive an AC voltage between the row and columns for period of 40 ms at a frequency of 250 Hz. 25 V was applied to the pixels in the selected row that were to remain in the stable planar texture. For pixels in the selected row to transition to the focal conic texture, 75 V was applied. Pixels in the non-selected rows experienced an AC voltage of 25 V at a frequency of 250 Hz for the duration of the updating process. After all rows have been addressed, all voltages were removed from the display panel, allowing all pixels to stabilize into their final reflective states. The display image and resulting gap states are shown in FIG. 3a.

Drive method 5 can have many variations. For example, the time to transition the pixels from stable planar to focal conic can be reduced by applying a selection voltage that is greater than V2 of FIG. 2. The voltage following this shortened high voltage pulse can be zero volts or it can be some holding voltage, as described in U.S. Patent application 2005/0024307 A1, incorporated herein by reference. There can be cases where there are multiple pulses. It is understood that in all cases where the display is first reset into the stable planar texture and then update by means of transitioning select pixels to the focal conic texture is the enabling feature of this invention.

TABLE 1

Gap states of a passive matrix display having a field-spreading layer written with selected drive methods.

| # | Drive Method | Scope | Dark Gaps[1] | Light Gaps[2] | Desirability |
|---|---|---|---|---|---|
| 1 | Conventional, FC Reset, Right-Slope Select | Check | Dark | Dark | Low |
| 2 | Conventional, Planar Reset, Right-Slope Select | Check | Light | Dark | Very Low |
| 3 | Pulse Accumulation, Right-Slope Select | Check | Dark | Dark | Low |
| 4 | U/√2 Dynamic | Check | Light | Light | Low |
| 5 | Planar Reset, Left-Slope Select | Invention | Dark | Light | Very High |

[1]State achieved in row gaps between neighboring dark pixels.
[2]State achieved in row gaps between neighboring light pixels.

Although all these drive methods successfully imaged the passive matrix cholesteric displays with or without field-spreading layers, the unexpected result is that only methods having planar reset and a left-slope selection phases achieve the most desired combination of light and dark gaps necessary for optimum contrast when uses in combination with displays having at least one field-spreading layer. The most desired pixel and gap combination is one of having a light gap between neighboring light pixel and a dark gap between neighboring dark pixels.

The invention has been described in detail with particular reference to certain preferred embodiments thereof, but it will be understood that variations and modifications can be effected within the spirit and scope of the invention.

The invention claimed is:
1. A bistable matrix-addressable display element comprising
   a substrate,
   a bistable electrically modulated imaging layer,
   at least one conductor, and at least one field-spreading layer adjacent to said bistable electrically modulated imaging layer and adjacent to said at least one conductor, wherein said field-spreading layer has a sheet resistance (SER) of from $10^9$ to $10^6$ Ohms per square;

the bistable matrix-addressable display element comprises an area to be updated, wherein said area to be updated comprises rows of pixels; and the bistable matrix-addressable display element is imaged by applying a sequence of drive signals having a 4-phase approach, wherein said 4-phase approach comprises:

in phase 1, applying a first pixel voltage across said pixels of said area to be updated such that the critical voltage is reached; and holding said first pixel voltage until a homeotropic texture is reached;

in phase 2, setting a second pixel voltage to allow said homeotropic texture to relax into a stable planar texture;

in phase 3, selecting one row of pixels of said rows of pixels of said area to be updated; and updating said one row of pixels by addressing, wherein addressing comprises applying a third pixel voltage, capable of switching said pixels from said stable planar texture to said non-reflective focal conic texture, across said pixels to produce switched pixels;

applying a fourth pixel voltage, incapable of switching said pixels from said stable planar texture to said non-reflective focal conic texture, to produce unswitched pixels to remain in the stable planar texture; and repeating said addressing until said rows of pixels of said area to be updated have been addressed; and in phase 4, removing said first pixel voltage, said second pixel voltage, said third pixel voltage, and said fourth pixel voltage from said area of said bistable matrix-addressable display element to be updated.

2. The bistable matrix-addressable display element of claim 1 wherein said bistable electrically modulated imaging layer comprises a liquid crystal material.

3. The bistable matrix-addressable display element of claim 1 wherein said bistable electrically modulated imaging layer comprises a polymer dispersed chiral nematic liquid crystal material.

4. The bistable matrix-addressable display element of claim 1 wherein said bistable electrically modulated imaging layer comprises an electrophoretic material.

5. The bistable matrix-addressable display element of claim 1 wherein said bistable electrically modulated imaging layer comprises a field or voltage driven switching layer.

6. The bistable matrix-addressable display element of claim 1 wherein said field-spreading layer comprises a colorant having a contrasting color to the reflection maximum of said bistable electrically modulated imaging layer.

7. The bistable matrix-addressable display element of claim 1 wherein said field-spreading layer is transparent.

8. The bistable matrix-addressable display element of claim 1 wherein said field-spreading layer comprises at least one member selected from the group consisting of conjugated conducting polymers, conducting carbon particles, crystalline semiconductor particles, amorphous semiconductive fibrils, continuous conductive metal and semiconducting thin films.

9. The bistable matrix-addressable display element of claim 1 wherein said field-spreading layer comprises electronically conductive metal-containing particles.

10. The bistable matrix-addressable display element of claim 9 wherein said electronically conductive metal-containing particles are semiconducting metal oxides.

11. The bistable matrix-addressable display element of claim 9 wherein said electronically conductive metal-containing particles are conductive crystalline inorganic oxides, conductive metal antimonates, or conductive inorganic non-oxides.

12. The bistable matrix-addressable display element of claim 1 wherein said field-spreading layer comprises electronically conductive polymer.

13. The bistable matrix-addressable display element of claim 12 wherein said electronically conductive polymer is at least one member selected from the group consisting of substituted or unsubstituted polythiophenes, substituted or unsubstituted polypyrroles, and substituted or unsubstituted polyanilines.

14. The bistable matrix-addressable display element of claim 1 wherein said at least one conductor is a first conductor located between said substrate and said bistable electrically modulated imaging layer.

15. The bistable matrix-addressable display element of claim 14 further comprising at least a second conductor on the side of said bistable electrically modulated imaging layer opposite said first conductor.

16. The bistable matrix-addressable display element of claim 1 wherein said at least one conductor is a conductor located on the side of said bistable electrically modulated imaging layer opposite said substrate.

* * * * *

UNITED STATES PATENT AND TRADEMARK OFFICE
CERTIFICATE OF CORRECTION

| | |
|---|---|
| PATENT NO. | : 7,999,832 B2 |
| APPLICATION NO. | : 11/134758 |
| DATED | : August 16, 2011 |
| INVENTOR(S) | : Burberry et al. |

It is certified that error appears in the above-identified patent and that said Letters Patent is hereby corrected as shown below:

<u>Column 9</u>
Line 9, "ferrroelectric" should read --ferroelectric--.

Signed and Sealed this
Tenth Day of July, 2012

David J. Kappos
*Director of the United States Patent and Trademark Office*